United States Patent [19]

Singleton et al.

[11] Patent Number: 5,939,350

[45] Date of Patent: Aug. 17, 1999

[54] PROCESSES AND CATALYSTS FOR CONDUCTING FISCHER-TROPSCH SYNTHESIS IN A SLURRY BUBBLE COLUMN REACTOR

[75] Inventors: Alan H. Singleton, Marshall Township, Allegheny County; Rachid Oukaci, Allison Park; James G. Goodwin, Cranberry Township, all of Pa.

[73] Assignee: Energy International Corporation, Pittsburgh, Pa.

[21] Appl. No.: 08/797,834

[22] Filed: Feb. 10, 1997

[51] Int. Cl.[6] .............................. B01J 27/13; B01J 21/08; B01J 21/04
[52] U.S. Cl. ......................... 502/230; 502/261; 502/260; 502/224; 502/229; 502/439
[58] Field of Search ..................................... 502/261, 230, 502/260, 224, 229, 439

[56] References Cited

U.S. PATENT DOCUMENTS

| | | |
|---|---|---|
| 3,988,263 | 10/1976 | Hansford . |
| 4,079,072 | 3/1978 | Finch . |
| 4,088,671 | 5/1978 | Kobylinski . |
| 4,219,445 | 8/1980 | Finch . |
| 4,235,754 | 11/1980 | Chester . |
| 4,385,193 | 5/1983 | Bijwaard et al. . |
| 4,499,209 | 2/1985 | Hoek et al. . |
| 4,565,831 | 1/1986 | Wright et al. . |
| 4,567,205 | 1/1986 | Arcuri et al. . |
| 4,822,824 | 4/1989 | Iglesia et al. . |
| 4,863,890 | 9/1989 | Koll ........................................ 502/230 |
| 4,880,763 | 11/1989 | Eri et al. . |
| 5,023,277 | 6/1991 | McAteer . |
| 5,116,800 | 5/1992 | Williamson et al. . |
| 5,424,264 | 6/1995 | Richard et al. ........................ 502/261 |
| 5,639,798 | 6/1997 | Wilson et al. . |

FOREIGN PATENT DOCUMENTS

| | | |
|---|---|---|
| 174696B1 | 3/1986 | European Pat. Off. . |
| 178008B1 | 4/1986 | European Pat. Off. . |
| 454256B1 | 10/1991 | European Pat. Off. . |
| 533227b1 | 3/1993 | European Pat. Off. . |
| 579 330 B1 | 5/1996 | European Pat. Off. . |
| 0736326A1 | 9/1996 | European Pat. Off. . |

OTHER PUBLICATIONS

Andreas Kogelbauer et al. Journal of Catalysis, vol. 160, pp. 125–133 (1996).

*Primary Examiner*—Paul J. Killos
*Assistant Examiner*—J. Parsa
*Attorney, Agent, or Firm*—Fellers, Snider, Blankenship, Bailey & Tippens, P.C.

[57] ABSTRACT

Processes and catalysts for conducting Fischer-Tropsch synthesis in a slurry bubble column reactor (SBCR). One aspect of the invention involves the use of cobalt catalysts without noble metal promotion in an SBCR. Another aspect involves using palladium promoted cobalt catalysts in an SBCR. Methods for preparing noble metal promoted catalysts via totally aqueous impregnation and procedures for producing attrition resistant catalysts are also provided.

16 Claims, 1 Drawing Sheet

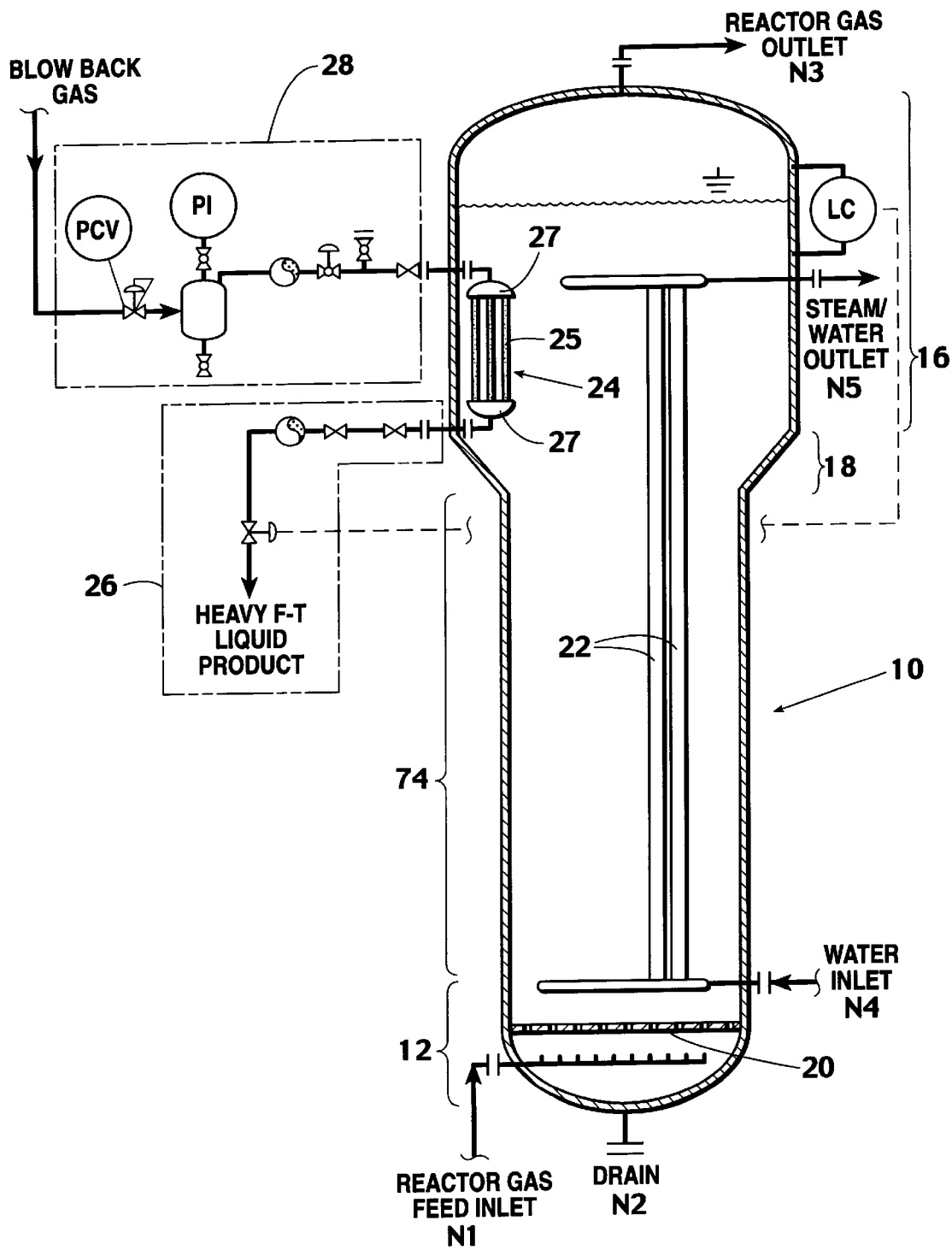

PROCESSES AND CATALYSTS FOR CONDUCTING FISCHER-TROPSCH SYNTHESIS IN A SLURRY BUBBLE COLUMN REACTOR

The Government of the United States of America has rights in this invention pursuant to Contract No. DE-AC22-92PC92108 awarded by the U.S. Department of Energy.

BACKGROUND OF THE INVENTION

1. Technical Field

This invention relates generally to processes for conducting Fischer-Tropsch synthesis, and, more specifically, to processes employing a slurry bubble column reactor and catalysts therefore to carry out three phase Fischer-Tropsch reactions.

2. Background

Synthesis gas, or "syngas" is a mixture consisting primarily of hydrogen and carbon oxides. Syngas is produced during coal gasification, and processes are well known to obtain syngas from other hydrocarbons, including natural gas. U.S. Pat. No. 4,423,265 to Chu et al., Col. 1, notes that processes for producing syngas of major importance depend either on the partial combustion of the hydrocarbon fuel with an oxygen-containing gas or on the reaction of the fuel with steam, or on a combination of these two reactions. U.S. Pat. No. 5,324,335 to Benham et al., Col. 2, explains the two primary methods for producing syngas from methane: steam reforming and partial oxidation. The Encyclopedia of Chemical Technology, Second Edition, Volume 10, pages 353–433 (1966), Interscience Publishers, New York, N.Y. and Third Edition, Volume 11, pages 410–446 (1980), John Wiley and Sons, New York, N.Y. is said by Chu et al. to contain an excellent summary of gas manufacture, including the manufacture of synthesis gas.

It has long been recognized that syngas can be converted to liquid hydrocarbons by the catalytic hydrogenation of carbon monoxide. The general chemistry of the much studied Fischer-Tropsch synthesis is as follows:

(1) $CO + 2H_2 \rightarrow (-CH_2-) + H_2O$ 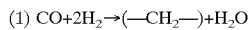

(2) $2CO + H_2 \rightarrow (-CH_2-) + CO_2$ 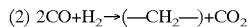

The types and amounts of reaction products, i.e. the length of carbon chains, obtained via Fischer-Tropsch synthesis varies dependent upon process kinetics and choice of catalyst.

Many attempts at providing effective catalysts for selectively converting syngas to liquid hydrocarbons have previously been disclosed. U.S. Pat. No. 5,248,701 to Soled et al., Col. 1–3, presents an overview of relevant patent art.

The two most popular types of catalysts heretofore used in the Fischer-Tropsch synthesis are iron-based catalysts and cobalt-based catalysts. U.S. Pat. No. 5,324,335 to Benham et al., Col. 1, discusses the fact that iron-based catalysts, due to their high water gas shift activity, favor the overall reaction shown in (2) above, while cobalt-based catalysts tend to favor the overall reaction of scheme (1).

Recent advances have provided a number of catalysts active in Fischer-Tropsch synthesis. Besides iron and cobalt, other Group VIII metals, particularly ruthenium, are known Fischer-Tropsch catalysts.

It is the current practice to support such catalysts on a porous inorganic refractory oxide. Particularly preferred supports include silica, alumina, silica-alumina, and titania. In addition, other refractory oxides selected from Groups III, IV, V, VI and VIII may be used as a catalyst support.

The prevailing practice is also to add promoters to the supported catalyst. Promoters can include ruthenium (when not used as the primary catalyst), rhenium, hafnium, cerium and zirconium. Promoters are known to increase the activity of the catalyst, sometimes rendering the catalyst three to four times as active as its unpromoted counterpart.

Contemporary cobalt catalysts are typically prepared by impregnation of the catalyst upon the support. As described in U.S. Pat. No. 5,252,613 to Chang et al., Col. 4–5, a typical catalyst preparation may involve impregnation, by incipient wetness or other known techniques, of, for example, a cobalt nitrate salt onto a titania, silica or alumina support, optionally followed or preceded by impregnation with a promotor material. Excess liquid is removed and the catalyst precursor is dried. Following drying or as a continuation thereof, the catalyst is calcined to convert the salt or compound to its corresponding oxide(s). The oxide is then reduced by treatment with hydrogen or a hydrogen containing gas for a period of time sufficient to substantially reduce the oxide to the elemental or catalytic form of the metal. U.S. Pat. No. 5,498,638 to Long points to U.S. Pat. Nos. 4,637,993, 4,717,702, 4,477,595, 4,663,305, 4,822,824, 5,036,032, 5,140,050, 5,292,705 as disclosing well known catalyst preparation techniques.

Fischer-Tropsch synthesis has primarily been conducted in fixed bed reactors, gas-solid reactors, and gas entrained fluidized bed reactors, fixed bed reactors being the most utilized. U.S. Pat. No. 4,670,472 to Dyer et al., Col. 1, provides a bibliography of several references describing these systems.

More recently, however, attention has been directed to conducting Fischer-Tropsch synthesis in three phase slurry reactors. Three phase reactions involve the introduction of a fluidizing gas into a reactor containing catalyst particles slurried in a liquid. Particularly useful in Fischer-Tropsch processes is the slurry bubble column reactor (SBCR). In an SBCR, catalyst particles are slurried in liquid hydrocarbons within a reactor chamber, typically a tall column. Syngas is then introduced at the bottom of the column through a distributor plate, which produces small gas bubbles. The gas bubbles migrate up and through the column, causing a beneficial turbulence, while reacting with the catalyst to produce liquid and gaseous hydrocarbon products. Gaseous products are captured at the top of the SBCR, while liquid products are recovered through a filter which separates the liquid hydrocarbons from the catalyst fines. U.S. Pat. Nos. 4,684,756, 4,788,222, 5,157,054, 5,348,982, and 5,527,473 reference this type of system and provide citations to pertinent patent and literature art.

Using an SBCR to conduct Fischer-Tropsch synthesis has certain recognized advantages. As noted by Rice et al. in U.S. Pat. No. 4,788,222, Col. 5, advantages of a slurry process over that of a fixed bed process include better control of the exothermic heat produced during the reactions and better control over catalyst activity maintenance by allowing continuous recycling, recovery and rejuvenation procedures to be implemented. U.S. Pat. Nos. 5,157,054, 5,348,982, and 5,527,473 also discuss advantages flowing from the use of an SBCR. Heretofore, catalyst particle size has not been deemed to be a critical parameter in SBCRs. It is desired that the catalyst particle be reasonably filterable, but also easily dispersible. The art suggests that particle sizes of 1–200 microns meet these requirements. (See Chang, Col. 5).

Notwithstanding the research and development heretofore conducted, Fischer-Tropsch synthesis in a three phase slurry bubble column reactor is by no means a refined procedure. The process remains expensive, owing in part to the significant cost of promoted catalysts in the current state of the art. Environmental concerns also come into play, not only with respect to the operation of an SBCR, but also with regard to the preparation of catalysts, which involves the use of organic solvents. The SBCR process is also extremely demanding upon the catalyst from a physical strength standpoint which leads to severe attrition of the catalyst particles and resulting in catalyst loss or filtration problems.

The present invention encompasses certain discoveries that have resulted in a more rate efficient, environmentally friendly and more cost efficient process for conducting Fischer-Tropsch synthesis in a slurry bubble column reactor.

SUMMARY OF THE INVENTION

Four main aspects of the present invention are summarized below. Each has applicability to Fischer-Tropsch synthesis in a slurry bubble column reactor (although some aspects can also be applied to other synthesis technologies). Each aspect is reported in greater detail under headings in the Detailed Description that follows. The first aspect described relates to the unexpectedly good results obtained through the use of unpromoted (without noble metal) cobalt catalysts in a slurry bubble column reactor. The second aspect involves the use of palladium promoted cobalt catalysts in both fixed bed and slurry bubble column reactors. The third aspect concerns the preparation of noble metal promoted catalysts via totally aqueous impregnation. The fourth aspect relates to attrition resistant cobalt catalysts for slurry bubble column reactor applications.

Advanced supported cobalt catalysts for Fischer-Tropsch synthesis have invariably required extensive noble metal, or near noble metal, promotion to enhance the reducibility of the cobalt to the extent required to achieve high F-T conversion activity. It has been discovered, however, that unpromoted cobalt catalysts having the expected lesser activity in fixed bed reactor applications unexpectedly have F-T conversion activity in a slurry bubble column reactor that is comparable to the best promoted formulations. The implementation of this remarkable discovery significantly decreases the cost of the SBCR conversion process, as the more expensive promoted catalysts need not be utilized to achieve acceptable results.

In the same vein, the use of zirconium oxide in the promotion of cobalt reduction in fixed bed catalysts utilizing either gamma alumina or silica supports is known to result in substantially lower activity than its ruthenium promoted analog. It has been discovered, however, that the utilization of these catalysts in a slurry bubble column reactor unexpectedly provides similar kinetic and selectivity results as the ruthenium promoted SBCR analog. Consequently, catalyzing SBCR processes with zirconium-modified alumina-supported cobalt and zirconium-modified silica-supported cobalt is shown to be advantageous and extremely cost efficient.

Under certain circumstances, however, a promoted catalyst may still be desired. Another aspect of the present invention includes the preparation and use of palladium promoted cobalt catalysts for F-T synthesis. Palladium is one of the most economic of the family of noble metals capable of promoting cobalt reducibility; heretofore, though, the use of palladium as a promoter for cobalt-based F-T catalysts has not been thought to be very advantageous, see e.g. U.S. Pat. No. 5,102,852. On the contrary, it has been suggested that the addition of palladium to a cobalt catalyst compared to the addition of platinum, iridium or rhodium results in slight or no improvement in catalyst activity for F-T synthesis.

But it has been discovered in connection with the present invention that palladium promoted cobalt catalysts used in a fixed bed reactor do indeed show a significant activity enhancement above that of an unpromoted cobalt catalyst. Moreover, the results obtained with the same palladium promoted cobalt catalyst in a slurry bubble column reactor were unexpectedly comparable to those obtained with ruthenium promoted catalysts. In addition, temperature programmed reduction studies have shown that palladium addition has a similar positive effect on cobalt reducibility to that provided by ruthenium addition.

A further aspect of the invention involves a process for preparing a promoted cobalt catalyst supported on gamma alumina via a single step totally aqueous co-impregnation of cobalt and promoter, preferably ruthenium. While ruthenium is another economic member of the family of noble metals capable of promoting cobalt reducibility, the solubility characteristics of practical ruthenium salts have usually led to the use of one or another organic solvents as the catalyst impregnating media for ruthenium. Though ruthenium is the preferred promoter for use in this process, the palladium promoted cobalt catalyst described above may also be prepared by this method.

As with all impregnation methods, the organic impregnation of one or all metals is followed by a drying step that involves the evaporation of the organic solvent, which requires some environmentally acceptable way of disposing of it in order to avoid its release into the atmosphere. In addition, special explosion proof equipment for catalyst drying and calcination is required in any large scale application. This requirement for ancillary equipment for catalyst pretreatment and disposal of large quantities of organic solvents adds a heavy burden on the catalyst cost. The totally aqueous preparation techniques of the present invention when available are preferred for safety, environmental and economic reasons.

The preferred impregnation method includes the steps of:
(a) calcining a gamma alumina support;
(b) impregnating the support with an aqueous solution of cobalt nitrate and a promoter-nitrate using an appropriate quantity to achieve incipient wetness with a desired loading of cobalt and promoter to obtain a catalyst precursor;
(c) drying the catalyst precursor with moderate stirring such as to remove solvent water and obtain a dried catalyst; and
(d) calcining the dried catalyst in air by slowly raising its temperature over time to obtain a final catalyst composition.

Related aspects of the invention include a Fischer-Tropsch catalyst produced by the above-described process and a method of preparing liquid hydrocarbons, which method comprises the catalytic hydrogenation of carbon monoxide under Fischer-Tropsch conditions in the presence of such catalyst.

Use of slurry bubble column reactors for commercial reactions such as methanol and Fischer-Tropsch synthesis offers significant advantages over standard fixed-bed reactors. However, the slurry bubble column reactor process is one that is extremely demanding on the catalyst from a physical strength standpoint. The tumbling of the catalyst particles in the slurry mixture can cause severe attrition of the particles. Many catalyst formulations fail to have practical application because of the rate of physical attrition experienced in this abrasive environment. This results in poorer distribution of the catalyst in the reactor, filtration problems in removing liquid products, and possibly contamination of the products by the catalytic material. It is known that the use of preformed spheroidal supports in the preparation of supported metal catalysts for fluidized bed applications helps to minimize catalyst attrition, but such a concept has not been well delineated for slurry type reactors.

It has been discovered that for cobalt catalysts used in Fischer-Tropsch synthesis in slurry bubble column reactors, proper preparation of alumina supported cobalt ($Co/Al_2O_3$) catalysts involving the use of a pre-formed spheroidal γ-alumina support having a high surface area and sphere sizes of 20–150 μm provides a much more attrition resistant catalyst than cobalt on other oxide supports such as silica— even when they are spheroidal. The attrition resistance is found to be even greater when the catalyst is promoted with lanthana ($La_2O_3$) as well.

A better understanding of the present invention, its several aspects, and its objects and advantages will become apparent to those skilled in this art from the following detailed description, taken in conjunction with the attached drawings, wherein there is shown and described only the preferred embodiment of the invention, simply by way of illustration of the best mode contemplated for carrying out the invention. As will be realized, the invention is capable of modifications in various obvious respects, all without departing from the invention. Accordingly, the description should be regarded as illustrative in nature and not as restrictive.

BRIEF DESCRIPTION OF THE DRAWINGS

FIG. 1 is a sectional view of a preferred slurry bubble column reactor in which to practice the processes disclosed herein.

DETAILED DESCRIPTION OF THE PREFERRED EMBODIMENT

A preferred slurry bubble column reactor useful to practice the processes disclosed herein is illustrated in FIG. 1. The cylindrical, vertically-oriented column or reactor 10 has a lower end 12, a mid-section 14 and an upper end 16. The lower end 12 and mid-section 14 are of a common diameter, whereas the upper end 16 is of a slightly increased diameter. A transition area 18 defined by an outwardly sloping wall connects the mid-section 14 to the upper end 16. During normal operation, the reactor 10 is filled with a slurry consisting of liquid product and catalyst fines.

Focusing on the lower end 12 of the reactor 10, a reactor gas feed inlet N1 is provided for injecting reactants such as CO and $H_2$ into the interior of the reactor 10. Immediately above the gas inlet N1 is a gas permeable, perforated plate distributor 20. Reactants input via the gas inlet N1 bubble up through the plate distributor 20 into the slurry. A drain N2 is located on the bottom of the reactor 10, while a reactor gas outlet N3 is positioned at the top of the reactor 10.

Within the mid-section 14 of the reactor 10 is a plurality of coolant tubes 22 which function as heat exchangers. A water inlet N4 toward the bottom of the reactor 10 supplies water to the coolant tubes 22. A steam/water outlet N5 is located toward the top of the reactor 10.

Spaced equally around the circumference of the upper section 16 of the reactor 10 are seven candle filter clusters 24. Each cluster 24 is about 8–10 inches wide and 6 feet tall. The clusters 24 consist of three porous sintered metal candle filters 25 for 10 micron particle size retention retained between opposing end caps 27. The clusters 24 are completely submerged at least 6 inches below the slurry level. Heavy Fischer-Tropsch liquid product is drained from the clusters 24 through a lower piping and valve system 26. A blow back gas is available for use through an upper piping and valve system 28. Injection of blow back gas is used periodically as a filter cleansing mechanism.

In operation, the reactor 10 is filled with the slurry (through a slurry inlet) to a point above the candle filter clusters 24. Reactant gas is introduced through nozzle N1 and the plate distributor 20 into the slurry, contacting the catalyst fines contained in the slurry to catalytically produce more heavy F-T liquid product. The candle filters 24 remove this product from the slurry and output the filtered product through the lower piping and valve system 26. This is done in a continuous fashion such that the level of the slurry is maintained above the candle filter clusters 24.

Use of Cobalt Catalysts Without Noble Metal Promotion in an SBCR

Noble or near noble metal promotion of alumina-supported cobalt catalysts is known to produce by far the most active cobalt catalysts for Fischer-Tropsch synthesis in a fixed bed reactor. Alumina supported cobalt ($Co/Al_2O_3$) without any promoter is 3–4 times less active than a catalyst with noble metal promotion in a fixed bed reactor.

Unpromoted silica-supported cobalt ($Co/SiO_2$) is also a poor catalyst for F-T synthesis. Zirconium (Zr) promotion of $Co/SiO_2$ results in a catalyst more active than a ruthenium (Ru) promoted one, but, in a fixed bed reactor, the activities of these "best" silica-supported cobalt catalysts are still significantly less than those of promoted alumina-supported cobalt catalysts.

Zirconium promotion of $Co/Al_2O_3$ and $Co/SiO_2$ results in significantly improved activity in a fixed bed reactor, but it remains somewhat less active than Ru-promoted $Co/Al_2O_3$.

It has been discovered, however, that unpromoted $Co/Al_2O_3$, Zr-modified $Co/Al_2O_3$ and Zr-modified $Co/SiO_2$ unexpectedly perform in a comparable manner in terms of activity with the best noble metal promoted alumina-supported catalysts in a slurry bubble column reactor. This is not true of Ru-promoted $Co/SiO_2$ which shows no improvement over unpromoted $Co/SiO_2$. Table 1 below compares the unpromoted and Zr-modified cobalt catalysts performance in both fixed bed and slurry bubble column reactors to Ru-promoted cobalt catalyst performance.

The similarity in performance of the unpromoted $Co/Al_2O_3$ as well as the Zr-promoted cobalt catalysts with the noble metal promoted $Co/Al_2O_3$ may be attributable to possible mass transfer limitations under certain reaction conditions in a slurry bubble column reactor. In order to ascertain that the SBCR results represent the intrinsic activity of the catalysts, some of these catalysts were tested in a continuously stirred tank reactor (CSTR) where mass transfer limitations are usually negligible and true intrinsic kinetics can be measured. The performance of two cobalt catalysts (unpromoted $Co/Al_2O_3$ and Ru-promoted $Co/Al_2O_3$) in the CSTR under similar reaction conditions to those used in the SBCR is included in Table 1. A comparison of the data from both the CSTR and the SBCR indicate that the activities for F-T synthesis obtained with both catalysts are, within experimental error, similar. Such results indicate, therefore, that the reaction in the SBCR may be considered free from mass transfer limitations under the conditions used for testing all the catalysts described here.

TABLE 1

Catalysts Performances in Fixed Bed versus Slurry Bubble Column Reactors

| Catalyst No. | Support | Promoter(s) (wt %) | Reactor | Run No. | Activity (g-HC/g-cat./h) 220° C. | 240° C. |
|---|---|---|---|---|---|---|
| Co.053 | $Al_2O_3$ | Ru (0.5) | FB | 3 | 0.453 | |
| Co.005 | $Al_2O_3$ | none | FB | 10 | 0.106 | |
| Co.031 | $Al_2O_3$ | Zr (1.4) (ss) | FB | 1 | 0.060 | |
| Co.034 | $Al_2O_3$ | Zr (8.5) (ms) | FB | 1 | 0.275 | |
| Co.012 | $SiO_2$ | none | FB | 4 | 0.105 | |
| Co.019 | $SiO_2$ | Ru (0.5) | FB | 3 | 0.142 | |
| Co.025 | $SiO_2$ | Zr (8.5) | FB | 1 | 0.160 | |
| Co.053 | $Al_2O_3$ | Ru (0.5) | SBCR | M4-12-1 | 0.66 | 1.56 |
| Co.005 | $Al_2O_3$ | none | SBCR | M3-15-1 | 0.53 | 1.34 |
| Co.031 | $Al_2O_3$ | Zr (1.4) (ss) | SBCR | M3-26-1 | 0.62 | 1.41 |
| Co.034 | $Al_2O_3$ | Zr (8.5) (ms) | SBCR | M4-15-1 | 0.61 | 1.54 |
| Co.012 | $SiO_2$ | none | SBCR | M3-7-1 | 0.23 | 0.63 |
| Co.019 | $SiO_2$ | Ru (0.5) | SBCR | M3-14-1 | 0.18 | 0.66 |
| Co.025 | $SiO_2$ | Zr (8.5) (ms) | SBCR | M3-17-1 | 0.39 | 1.24 |
| Co.053 | $Al_2O_3$ | Ru (0.5) | CSTR | LGX-188 | 0.56 | 1.39 |
| Co.005 | $Al_2O_3$ | none | CSTR | LGX-186 | 0.72 | 1.33 | ss=single step co-impregnation of Zr and Co
ms=multiple step impregnation with Zr pre-impregnation
FB=Fixed bed reactor
SBCR=Slurry bubble column reactor
CSTR=Continuously stirred tank reactor
Reaction conditions—in FB: P=1 atm, T=220–240° C., $H_2CO$=2; in SBCR: Catalyst weight: ca. 15 g, screened thru 150×400 mesh, calcined and reduced externally, T=220–240° C., P=450 psi, $H_2CO$=2, Total flow rate: ca. 15 L/min, Diluent: $N_2$: ca. 60%; in CSTR: Catalyst weight: ca. 17 g, T=220–240° C., P=450 psi, $H_2CO$=2.
Error in rate measurements±5%

The use of unpromoted $Co/Al_2O_3$ in slurry bubble column reactors and its unexpectedly high activity compared to that of noble metal promoted catalysts has gone unrecognized. References which discuss unpromoted cobalt catalysts (though with nothing specific on the actual formulation) suggest the need to use promoters such as ruthenium to enhance catalyst performance (e.g. U.S. Pat. No. 5,157,054 to Herbolzheimer et al.). The present invention is directed to just the opposite, i.e. the noble metal promoter is not needed in SBCR applications in order to obtain catalyst performance comparable to that of Ru-promoted cobalt catalysts. Avoidance of noble metal promotion of $Co/Al_2O_3$ will obviously result in a significantly less expensive catalyst and a more cost efficient process.

While the formulations of Zr-modified $Co/Al_2O_3$ and $Co/SiO_2$ themselves are not unique, their application to the SBCR and the unexpected results achieved from their utilization in an SBCR have gone unrecognized. As in the case of unpromoted $Co/Al_2O_3$ catalysts, it is the use of the formulations in the SBCR application and the unexpectedly good results obtained that make the process commercially significant.

With respect to the Zr-modified catalysts, it is hypothesized that the zirconia formed after calcination of the catalyst precursor acts to prevent the formation of cobalt compounds with the supports, especially in the presence of water, a by-product of the Fischer-Tropsch synthesis reaction. For $Co/Al_2O_3$, the reaction of cobalt with alumina substrate during the Fischer-Tropsch synthesis is less a problem.

These discoveries are made manifest in a new process for achieving a high yield production of liquid hydrocarbons from the catalytic hydrogenation of carbon monoxide in a slurry bubble column reactor. Advantage is obtained in utilizing a low cost catalyst without noble metal promotion. The preferred process includes the steps of:

(a) filling a slurry bubble column reactor with a measure of liquid hydrocarbons;

(b) adding thereto a catalyst selected from the group consisting of unpromoted alumina-supported cobalt, zirconium promoted alumina-supported cobalt and zirconium promoted silica-supported cobalt;

(c) bringing the slurry bubble column reactor to an operating temperature of between 190–300° C.; and (d) controllably feeding synthesis gas into the slurry bubble column reactor to achieve a Fischer-Tropsch reaction and obtain high yields of hydrocarbon.

Preferably, the catalysts comprise 10–40 wt. % cobalt.

In connection with other preferred aspects of the invention, 0.5–15 wt. % zirconium is used for the Zr-modified alumina or silica supported cobalt catalysts. Potassium addition results in increased chain growth probability and lower selectivity for methane. 0.1–5 wt. % of potassium has been found effective when combined with the Zr-modified catalysts as an additional non-noble metal promoter. It has also been found to be advantageous to modify the alumina-supported cobalt (without noble metal promotion) with 0.1–5 wt. % potassium as a selectivity promotor. An additional amount, preferably 1–10 wt. %, of zirconium is also useful to form an effective K/Zr-promoted $Co/Al_2O_3$.

The catalysts are preferably prepared by incipient wetness impregnation of the supports with aqueous solution of cobalt and/or zirconium nitrates. For the Zr promoted catalysts, single step co-impregnation of Co and Zr salts, or sequential impregnation with a pre-impregnation of Zr are used. Organic impregnation using an organic Zr compound can also be used. The catalysts are then dried to remove excess water and calcined to decompose the metal salts which are converted to metal oxides. The catalysts are reduced in hydrogen prior to reaction in order to convert the cobalt oxide into the active metal. Zr remains in the oxide form since zirconium oxide is not reducible under the condition used. It is actually the oxide which provides the promoting effect to the catalysts.

Processes Utilizing Palladium Promoted Cobalt Catalysts

Though cobalt catalysts lacking noble metal promotion have been discovered to have activity in a slurry bubble column reactor comparable to the best noble metal promoted catalysts, there are circumstances under which a promoted catalyst may still be desired. Certain reactor configurations may require higher operating temperatures and partial pressures which necessitate the use of a noble metal promoted catalyst. A noble metal promoted catalyst may also be easier to reduce insofar as requiring less stringent reduction conditions and lower hydrogen partial pressures. They may also be longer lived between reductions than their unpromoted counterparts.

Another aspect of the present invention relates to the preparation of palladium promoted cobalt catalysts suitable for Fischer-Tropsch synthesis to be carried out in fixed bed or slurry bubble column reactors. As mentioned above, cobalt catalysts supported on a carrier such as alumina, silica or titania are very active for this reaction when the cobalt is in its reduced state. Noble metal promoters are often used to improve the reducibility of the cobalt which results in improved activity of the cobalt catalyst for Fischer-Tropsch synthesis. Other promoters, such as potassium, may optionally be added to improve other catalyst properties such as selectivity, stability, etc.

The use of noble or near noble metals as promoters in cobalt Fischer-Tropsch catalysts has, of course, been reported—ruthenium in patents assigned to Gulf Oil, rhenium in patents assigned to Exxon, and rhenium, platinum, rhodium and iridium in patents assigned to Statoil. However, the use of palladium as a promoter for cobalt-based F-T catalysts has never been recognized as providing an unexpectedly high activity in either fixed bed or SBCR reactors. On the contrary, one of the patents assigned to Statoil (U.S. Pat. No. 5,102,852, Col. 11) states that addition of a non-Fischer-Tropsch metal such as palladium to a cobalt catalyst compared to the addition of platinum, iridium or rhenium results in slight or no improvement in catalyst activity for Fischer-Tropsch synthesis. In addition, FIG. 7 of the same patent shows that carbon monoxide conversion decreases with increasing palladium loading to a value below the one obtained with a catalyst containing no palladium at all. The range of palladium loadings tested varied from 0.1 to 1 wt. % with 12 wt. % cobalt, corresponding to Pd/Co atomic ratios of 0.0046 to 0.046. All the analysis and conclusions described were based on Fischer-Tropsch synthesis results obtained in a fixed bed reactor. Based on those findings, the use of palladium as a promoter was not thought promising.

Experiments conducted with palladium promoted Co catalysts in connection with the present invention (see Table 2), however, showed that in a fixed bed reactor significant activity enhancement (more than two-fold activity increase above that of a unpromoted Co/$Al_2O_3$) may be provided by addition of palladium. In addition, the activity results obtained with the same palladium promoted cobalt catalyst in a slurry bubble column reactor were unexpectedly comparable to those obtained with ruthenium promoted catalysts. Thus, it has been discovered that the activity improvement provided by palladium compared to non-promoted catalysts is significant and valid for both fixed bed and SBCR reactor applications.

TABLE 2

Palladium Promoted Cobalt Catalyst Performance

| Catalyst No. | Support | Promoter (wt %/ atom. ratio) | Reactor | Run No. | Activity (g-HC/g-cat./h) 220° C. | 240° C. |
|---|---|---|---|---|---|---|
| Co.005 | $Al_2O_3$ | none | FB | 10 | 0.106 | 0.239 |
| Co.053 | $Al_2O_3$ | RM (0.5/ 0.015) | FB | 3 | 0.453 | 0.647 |
| Co.068 | $Al_2O_3$ | Pd (1.0/ 0.027) | FB | 2 | 0.250 | 0.420 |
| Co.005 | $Al_2O_3$ | none | SBCR | M3-15-1 | 0.53 | 1.34 |
| Co.053 | $Al_2O_3$ | Ru (0.5/ 0.015) | SBCR | M4-29-1 | 0.59 | 1.19 |
| Co.068 | $Al_2O_3$ | Pd (1.0/ 0.027) | SBCR | M3-49-1 | — | 1.26 |

Reaction conditions—in FB: P=1 atm, T=220–240° C., $H_2CO$=2; in SBCR: Catalyst weight: ca. 15 g, screened thru 150×400 mesh, calcined and reduced externally, T=220–240° C., P=450 psi, $H_2CO$=2, Total flow rate: ca. 15 L/min, Diluent: $N_2$: ca. 60%.
Error in rate measurements=±5%

Furthermore, temperature programmed reduction studies have shown that palladium addition had a similar positive effect on cobalt reducibility to that provided by ruthenium addition.

These discoveries result in a process for achieving a high yield production of liquid hydrocarbons from the catalytic hydrogenation of carbon monoxide utilizing a palladium promoted catalyst. The preferred process includes the steps of:

(a) filling a slurry bubble column reactor with a measure of the liquid hydrocarbons;

(b) adding thereto a palladium promoted cobalt catalyst;

(c) bringing the slurry bubble column reactor to an operating temperature of between 190–300° C.; and (d) controllably feeding synthesis gas into the slurry bubble column reactor to achieve a Fischer-Tropsch reaction and obtain high yields of hydrocarbon.

Alternatively, the palladium promoted cobalt catalyst can be utilized in conventional fixed bed reactors.

Preferably, the catalyst comprises 10–40 wt. % cobalt and the cobalt is added to the supports by incipient wetness impregnation of the supports with a cobalt nitrate solution.

It is also preferred that the palladium promoted cobalt catalyst be supported on alumina and that the palladium be present in an amount of approximately 0.5–2.5 wt %, with a preferred value in the range of 0.8–1.3 wt %.

Preparation of Noble Metal Promoted Catalysts Via Totally Aqueous Impregnation

This aspect of the present invention relates to an environmentally friendly process for the preparation of a promoted cobalt catalyst suitable for Fischer-Tropsch synthesis. The Fischer-Tropsch synthesis using the catalyst from this invention may be carried out in a slurry bubble column reactor.

Until recently most of the known ruthenium-promoted cobalt catalysts were generally prepared by coprecipitation of the metal compounds onto a support material. Such methods do not usually result in well dispersed systems, which in turn result in an inefficient use of the active metals. Hansford, U.S. Pat. No. 3,988,263 and Kobylinski, U.S. Pat. No. 4,088,671. contain examples that can be referenced on this subject.

Due to this shortcoming, impregnation techniques became the preferred way of putting cobalt and its promoters onto a porous support. Catalyst preparation by impregnation has normally been carried out by contacting a porous support such as alumina with a solution of the dissolved compound of the relevant metal, followed by the removal of the solvent by evaporation (drying). The metal compound solution used can be either aqueous or organic. When two or more metals are to be incorporated on to a porous support as is the case with the present invention, several impregnation steps (such as sequential impregnation of the active metal (e.g. cobalt) and promoters with or without calcination of the catalyst precursors after the first metal impregnation, or co-impregnation of the metals in several steps with or without calcination of the catalyst precursor after each step) can be used. Obviously, an intimate contact between the active metal and the promoters as well as a uniform distribution of all the metals within the porous structure of the support is generally sought when impregnation techniques are used.

Thus, impregnation, either organic or aqueous, as a technique for cobalt catalyst preparation has been known in general terms. However, whenever ruthenium has been used specifically as a promoter, the impregnation methods have involved the use of an organic ruthenium precursor dissolved in an organic solvent. The solubility characteristics of practical ruthenium salts is the main reason which has invariably led to this use of organic solvents as the catalyst impregnating media for ruthenium in cobalt catalysts. The following are some examples of patents which are directly related to ruthenium promoted cobalt Fischer-Tropsch catalysts and which can be referenced on this subject: Beuther et al., U.S. Pat. No. 4,585,798 and Kobylinski et al., U.S. Pat. No. 4,605,676.

In contradistinction, the catalyst preparation method offered in connection with the present invention is a single step totally aqueous co-impregnation of cobalt and a promoter metal, such as ruthenium or palladium, followed by drying and calcination of the catalyst precursor. Preferably, the promoter-metal is in the form of a promoter-nitrate, such as ruthenium (III) nitrosyl nitrate or ruthenium (III) chloride. This method of preparation results in highly dispersed cobalt catalysts in which the promoter is believed to be in intimate contact with the cobalt. This intimate contact confers high reducibility to the cobalt catalyst.

As one example, a ruthenium promoted cobalt catalyst is prepared according to the following procedure. The support, preferably γ-alumina, is first calcined at 400–700° C., preferably 500° C., for 10 hours. It is then impregnated with an aqueous solution of cobalt nitrate [$Co(NO_3)_2 \cdot 6H_2O$] and ruthenium (III) nitrosyl nitrate [$Ru(NO)(NO_3)_3 \cdot xH_2O$] using an appropriate quantity to achieve incipient wetness with the desired loading of cobalt and ruthenium. The catalyst precursor is dried in an oven for 5 hours at 115° C. with moderate stirring in order to remove the solvent water. The dried catalyst is then calcined in air by raising its temperature at a heating rate of 1° C./min to 300° C. and holding for at least 2 hours.

In another example, the highly active palladium promoted cobalt catalyst discussed above was prepared in a similar fashion using palladium (II) nitrate [$Pd(NO_3)_2 \cdot xH_2O$].

Prior preparation methods for ruthenium promoted cobalt catalysts thus involved either the co-impregnation of both the cobalt and the ruthenium, with possibly other promoters, all dissolved in an organic solvent, or a sequential impregnation where cobalt was first deposited by an aqueous method followed by organic impregnation of the ruthenium compound and other promoters when present. All these methods have the well known disadvantages associated with the use of organic solvents.

On the contrary, the totally aqueous preparation techniques of the present invention are safer, environmentally friendly and economic.

Attrition Resistant Cobalt Catalysts for SBCR Applications

As mentioned above, the SBCR process is extremely demanding upon the catalyst from a physical strength standpoint which leads to severe attrition of the catalyst particles and decreases conversion activity.

It has been discovered that for cobalt catalysts used in Fischer-Tropsch synthesis in slurry bubble column reactors, proper preparation of $Co/Al_2O_3$ catalysts involving the use of a pre-formed spheroidal γ-alumina support having a high surface area and sphere sizes of 20–150 μm provides a much more attrition resistant catalyst than Co on other oxide supports such as silica—even when they are spheroidal. Following the selection of the support with such a narrow diameter range, the preparation of the attrition resistant catalyst involves impregnation, drying and calcination steps similar to those described supra. The use of these catalysts leads to unexpectedly high resistance to attrition while at the same time providing high conversion, high selectivity to transportation fuel range hydrocarbons, and long catalyst life.

The attrition resistance is found to be even greater when the alumina is further promoted with lanthana ($La_2O_3$). This improved attrition resistance provided by the addition of $La_2O_3$ is not detrimental to the cobalt activity for Fischer-Tropsch synthesis or its selectivity to higher hydrocarbons.

The attrition resistance of a number of catalysts prepared in accordance with this aspect of the invention is reported in Table 3. Attrition resistance is defined as the percent reduction in particle size based on their mean volumetric diameter as measured using a Microtrac particle size analyzer before reaction in the slurry bubble column reactor and after approximately 500 hour runs. Table 3 compares particle size reduction of promoted alumina supported catalysts of the present invention with promoted silica supported catalysts in a slurry bubble column reactor.

TABLE 3

SBCR Catalysts Particle Size Reduction

| Catalyst No. | Support | Promoters | Run No. | Particle Size, mvd (um) | Particle Size Reduction (%) |
|---|---|---|---|---|---|
| Co.001 | (Al) | La, Re, K | 2 (M3) | 42.0 | 4.6 |
| Co.001 | (Al) | La, Re, K | 1 (M3) | 42.0 | 2.3 |
| Co.002 | (Al) | La, Ru | 16 (M3) | 73.6 | 8.1 |
| Co.002 | (Al) | La, Ru | 1 (M4) | 73.6 | 10.0 |
| Co.002 | (Al) | La, Ru | 4 (M3) | 73.6 | 3.3 |
| Co.003 | (Al) | La, Ru | 5 (M3) | 76.8 | 5.5 |
| Co.004 | (Al) | La, Ru | 18 (M3) | 70.1 | 14.4 |
| Co.004 | (Al) | La, Ru | 21 (M4) | 81.4 | 10.4 |
| Co.015 | (Al) | La, Ru | 8 (M3) | 75.6 | 1.3 |
| Co.016 | (Al) | La, Ru | 10 (M3) | 64.6 | 0.3 |
| Co.016 | (Al) | La, Ru | 13 (M3) | 67.7 | 4.3 |
| Co.017 | (Al) | La, Ru | 11 (M3) | 73.1 | 4.4 |
| Co.055 | (Al) | La, Re | 31 (M3) | 85.6 | 12.9 |
| Co.058 | (Al) | La | 38 (M3) | 85.7 | 7.8 |
| Co.063 | (Al) | La | 40 (M3) | 89.0 | 9.3 |
| Co.005 | (Al) | — | 15 (M3) | 80.6 | 10.8 |
| Co.005 | (Al) | — | 37 (M4) | 84.7 | 19.3 |
| Co.005 | (Al) | — | 3 (M3) | 85.7 | 24.7 |
| Co.060 | (Al) | — | 34 (M3) | 87.5 | 7.5 |
| Co.070 | (Al) | — | 47 (M3) | 85.6 | 8.4 |
| CAL.02 | (Al) | Ru | 10 (M4) | 74.4 | 11.4 |
| CAL.04 | (Al) | Ru, K | 16 (M4) | 71.5 | 7.1 |
| CAL.05 | (Al) | Ru, K | 19 (M4) | 72.8 | 1.6 |
| CAL.08 | (Al) | Ru, K | 17 (M4) | 63.1 | 0.5 |
| CAL.09 | (Al) | Ru, K | 23 (M4) | 63.1 | 1.6 |
| CAL.10 | (Al) | Ru, K | 26 (M4) | 83.1 | 2.3 |
| CAL.11 | (Al) | Ru, K | 32 (M4) | 71.9 | 2.8 |
| CAL.12 | (Al) | Ru, K | 31 (m4) | 72.8 | 0.0 |
| CAL.13 | (Al) | Ru, K | 35 (M4) | 80.7 | 8.0 |
| CoW.05 | (Al) | Cu, Cr | 46 (M3) | 79.5 | 4.3 |
| CoW.11 | (Al) | Fe, Ru, K | 44 (M3) | 80.3 | 16.7 |
| CoW.13 | (Al) | Fe, Ru | 48 (M3) | 74.5 | 3.8 |
| Co.028 | (Al) | Ru, K | 6 (M4) | 80.8 | 11.1 |
| Co.029 | (Al) | Ru, K | 27 (M3) | 76.4 | 10.0 |
| Co.031 | (Al) | Zr | 26 (M3) | 75.5 | 9.4 |
| Co.032 | (Al) | Zr | 36 (M3) | 78.2 | 9.8 |
| Co.047 | (Al) | Ru, K | 25 (M3) | 79.4 | 12.9 |
| Co.047 | (Al) | Ru, K | 23 (M3) | 83.4 | 8.3 |
| Co.049 | (Al) | Ru, K | 24 (M3) | 81.3 | 13.8 |
| Co.053 | (Al) | Ru | 12 (M4) | 82.0 | 15.2 |
| Co.053 | (Al) | Ru | 29 (M3) | 75.6 | 6.0 |
| Co.053 | (Al) | Ru | 33 (M3) | 84.1 | 12.6 |
| Co.053 | (Al) | Ru | 24 (M4) | 75.6 | 6.5 |
| Co.062 | (Al) | Ru, K | 41 (M3) | 82.9 | 12.0 |
| Co.064 | (Al) | Ru, Zr | 39 (M3) | 83.7 | 16.0 |
| Co.065 | (Al) | Ru, Zr, K | 42 (M3) | 83.1 | 13.6 |

TABLE 3-continued

SBCR Catalysts Particle Size Reduction

| Catalyst No. | Support | Promoters | Run No. | Particle Size, mvd (um) | Particle Size Reduction (%) |
|---|---|---|---|---|---|
| Co.066 | (Al) | Ru, Fe | 50 (M3) | 77.2 | 6.4 |
| Co.011 | (Si) | — | 9 (M3) | 79.9 | 9.3 |
| Co.011 | (Si) | — | 30 (M4) | 84.0 | 35.7 |
| Co.011 | (Si) | — | 6 (M3) | 107.1 | 12.2 |
| Co.012 | (Si) | — | 7 (M3) | 105.2 | 3.7 |
| Co.019 | (Si) | Ru | 14 (M3) | 92.6 | 8.9 |
| Co.021 | (Si) | Zr | 19 (M3) | 86.2 | 9.6 |
| Co.025 | (Si) | Zr | 17 (M3) | 87.2 | 10.2 |
| Co.035 | (Si) | Zr | 5 (M4) | 89.1 | 19.2 |
| Co.041 | (Si) | Ru, Zr | 20 (M3) | 87.5 | 17.0 |
| Co.041 | (Si) | Ru, Zr | 35 (M3) | 87.5 | 7.8 |
| Co.044 | (Si) | Zr | 32 (M3) | 92.2 | 7.9 |
| Co.045 | (Si) | Zr | 37 (M3) | 95.7 | 28.0 |
| Co.048 | (Si) | Ru, Zr, K | 9 (M4) | 82.4 | 14.2 |
| Co.054 | (Si) | Zr, K | 13 (M4) | 101.2 | 18.6 |
| Co.056 | (Si) | La | 25 (M4) | 99.9 | 11.5 |
| Co.057 | (Si) | Re. La | 28 (M4) | 98.9 | 16.1 |

Reaction conditions—Catalyst weight: ca. 15 g for most runs, screened thru 150×400 mesh, T=220–240° C., P=450–600 psi, Total flow rate: ca. 15 L/min, or 3 cm/s linear velocity, run duration: ca. 500 h.

The average particle size reductions for each catalyst category shown in Table 3, including some unusual values which were probably due to experimental error, are as follows:

(1) All $Al_2O_3$-supported Co catalysts 8.4% All $SiO_2$-supported Co catalysts 13.7%

(2) All $Al_2O_3$-supported Co catalysts with $La_2O_3$ 6.6% All $Al_2O_3$-supported Co catalysts without $La_2O_3$ 9.2%

The attrition resistance attained with the narrow range alumina supported catalysts is suitable to allow use of a simple filtration system for the separation of the catalyst from liquid products and does not result in significant filter plugging in more than 3000 hours operation.

The uniformity in the reactor attributable to the narrow catalyst particle size distribution and the attendant hydrodynamic stability also results in unexpectedly high reactor productivity.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A process for preparing a supported, ruthenium-promoted, cobalt catalyst comprising the steps of:
   (a) calcining a support having a porous structure;
   (b) co-impregnating said support with an amount of an aqueous solution consisting essentially of water, cobalt nitrate, and at least one water soluble promoter compound, wherein said one water soluble promoter compound is a water soluble ruthenium compound, to obtain a catalyst precursor, said amount of said aqueous solution being not substantially more than an amount effective to achieve incipient wetness with a desired loading of cobalt and ruthenium and to obtain a uniform distribution of both said cobalt and said ruthenium within said porous structure,
   (c) drying said catalyst precursor to obtain a dried catalyst precursor;
   (d) calcining said dried catalyst precursor by slowly raising its temperature over time to obtain a calcined catalyst precursor; and
   (e) reducing said calcined catalyst precursor in a suitable reducing gas to obtain a final catalyst composition,
wherein said process is a totally aqueous impregnation process and said water soluble ruthenium compound is of a type sufficiently soluble in water in the presence of said cobalt nitrate to make said ruthenium compound effective for totally aqueous, incipient wetness impregnation.

2. The process according to claim 1, wherein said water soluble cobalt compound is a cobalt nitrate.

3. The process according to claim 1, wherein said support is a gamma-alumina support.

4. The process according to claim 3, wherein said support is calcined in step (a) at a temperature in the range of from about 400° C. to about 700° C.

5. The process according to claim 3, wherein said support is calcined in step (a) at a temperature of about 500° C. for about 10 hours.

6. The process according to claim 1, wherein said catalyst precursor is dried in step (c) with moderate stirring.

7. The process according to claim 6, wherein said catalyst precursor is dried in step (c) for about 5 hours at a temperature of about 115° C.

8. The process according to claim 1, wherein, in step (d), said dried catalyst is heated gradually to a calcining temperature and held at said calcining temperature for a time effective for calcining said dried catalyst.

9. The process according to claim 8, wherein, in step (d), said dried catalyst is heated to said calcining temperature at a rate of about 1° C. per minute.

10. The process according to claim 8, wherein said calcining temperature is about 300° C.

11. The process according to claim 10, wherein said time is about 2 hours.

12. The process according to claim 10, wherein said support is a gamma-alumina support.

13. The process according to claim 1, wherein step (b) is carried out in a single step.

14. A The process according to claim 1, wherein step (b) is carried out in multiple steps.

15. The process of claim 1 wherein said water soluble compound is a ruthenium halide.

16. The process according to claim 15 wherein said ruthenium halide is ruthenium (III) chloride.

* * * * *